United States Patent [19]

Hacker et al.

[11] Patent Number: 5,123,064
[45] Date of Patent: Jun. 16, 1992

[54] HAND-HELD DATA ENTRY SYSTEM AND REMOVABLE SIGNATURE PAD MODULE THEREFOR

[75] Inventors: David C. Hacker, Jacksonville, Fla.; Jerry L. Walter, Cedar Rapids, Iowa

[73] Assignee: Norand Corporation, Cedar Rapids, Iowa

[21] Appl. No.: 415,169

[22] Filed: Sep. 29, 1989

[51] Int. Cl.⁵ .......................... G06K 9/22; G06K 9/00; G09G 3/02; G08C 21/00
[52] U.S. Cl. .......................................... 382/59; 382/3; 340/706; 178/18; 364/709.11
[58] Field of Search ................ 382/3, 13, 59; 178/18, 178/19, 20; 340/706, 712; 364/709.01, 708, 709.11, 709.08, 709.10, 709.04

[56] References Cited

U.S. PATENT DOCUMENTS

| | | | |
|---|---|---|---|
| 4,005,400 | 1/1977 | Engdahl | 382/59 |
| 4,158,194 | 1/1979 | McWaters et al. | 382/59 |
| 4,718,103 | 1/1988 | Shojima et al. | 382/13 |
| 4,752,965 | 6/1988 | Dunkley et al. | 382/3 |
| 4,866,646 | 9/1989 | Nakamura et al. | 364/709.11 |
| 5,049,862 | 9/1991 | Dao et al. | 178/18 |

*Primary Examiner*—Leo H. Boudreau
*Assistant Examiner*—Michael R. Cammalata
*Attorney, Agent, or Firm*—McAndrews, Held & Malloy, Ltd.

[57] ABSTRACT

A data capturing module combined with a portable data terminal of the hand-held type to record handwritten data. Using a digitized pad, the module can provide for direct input of handwritten data into the system, or a peripheral digital scanner can be employed to provide for data entry. Depending upon the particular application, the module therefore provides for data entry of handwritten text or graphics using the data terminal and other components of a portable data system to enter, display, print or otherwise communicate the handwritten data.

7 Claims, 1 Drawing Sheet

HAND-HELD DATA ENTRY SYSTEM AND REMOVABLE SIGNATURE PAD MODULE THEREFOR

AUTHORIZATION PURSUANT TO 37 C.F.R. 1.71(d)(e)

A portion of the disclosure of this patent document contains material which is subject to copyright protection. The copyright owner has no objection to the facsimile reproduction by anyone of the patent document or the patent disclosure, as it appears in the Patent and Trademark Office, patent file or records, but otherwise reserves all copyright rights whatsoever.

BACKGROUND OF THE INVENTION

Hand-held data terminals or computers are commercially available for use in a variety of applications, including the distribution and control of products distributed by a route sales person. These hand-held data terminals provide the route sales person with the latest product and customer information as well as information regarding the inventory of the products being distributed. As products are distributed to the customer and other products picked up for return, this information is entered into the terminal together with payment or pricing information. Thus, these hand-held data terminals are useful in many applications for order entry, inventory control and route accounting in any industry where a product is being distributed.

Although these hand-held data terminals as a part of a distribution system have greatly increased the accuracy and efficiency of product distribution, there are situations where it is desirable to allow the capture and recording of handwritten data rather than data that is entered by keystrokes. One such use would be to provide for the recording of signatures and for verification of the signatures recorded. In some applications, digitized pads are available to permit the entry of handwritten data, usually in situations where the data is entered by marking a predetermined location on a form that overlies the pad. However, to date there does not appear to be available any means for combining a handwritten data entry module with a portable data terminal in such a way that the handwritten data can be directly entered or read and entered by a scanner.

SUMMARY OF THE INVENTION

The invention provides a means for recording and entering handwritten data in combination with a portable hand-held data terminal. The invention provides a module that is removably attachable to a hand-held computer terminal, which module allows the capture of handwritten data. In a preferred embodiment, the module provides a means for capturing handwritten data which is then read by an optical scanner and entered into the system. In the alternative, the module contains a digitized pad which can capture and enter the handwritten data immediately as it is entered on the pad. The preferred module of the invention is easily and quickly attached to a hand-held computer terminal by a hook-hinge arrangement, using the existing connector on the computer terminal and a connector on the module. In the embodiment of the module using a digitized pad, the module and hand-held terminal provide an integrated system while allowing normal hand-held portable operation with the module in place.

DESCRIPTION OF THE PREFERRED EMBODIMENTS OF THE INVENTION

Figure 1:
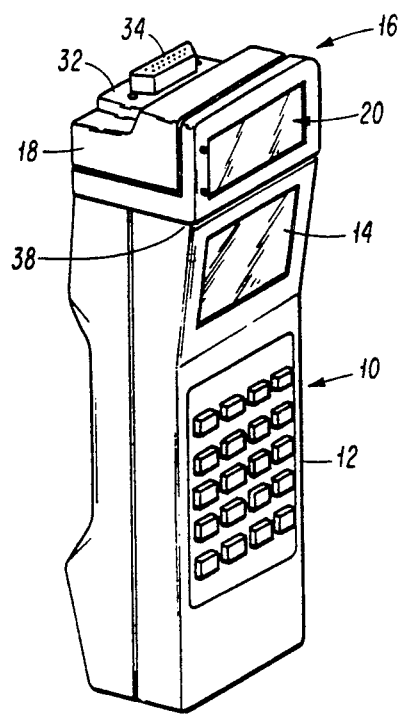
FIG. 1 is a perspective view of a hand-held data terminal with the module of the invention in place.
Figure 2:
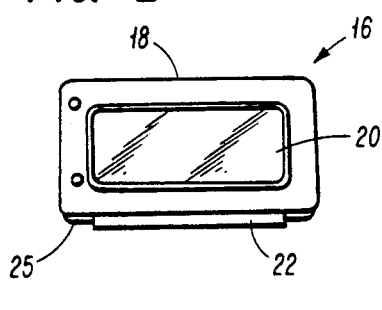
FIG. 2 is a front elevational view of the module.
Figure 3:
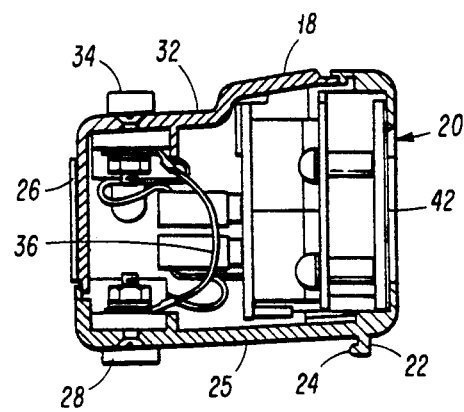
FIG. 3 is a sectional view of the module taken on the line 3—3 of FIG. 2.
Figure 4:
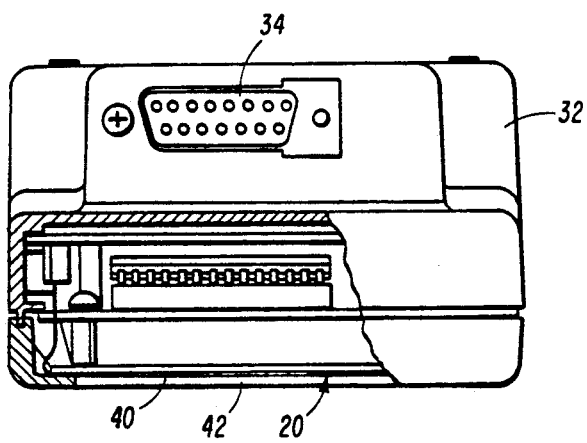
FIG. 4 is a top view of the module, partly in section.
Figure 5:
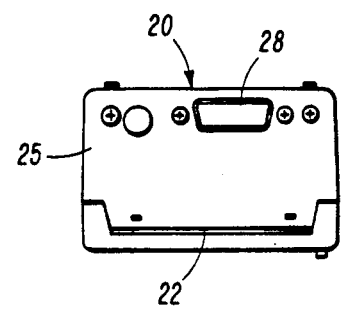
FIG. 5 is a bottom view of the module.

Referring first to FIG. 1 of the drawing, there is illustrated a hand-held data terminal or computer terminal 10 of a type suitable for use with the module of the invention. A computer terminal such as the Model NT141GL hand-held computer terminal of Norand Corporation, Cedar Rapids, Iowa, has the necessary power and flexibility for this application. The computer terminal 10 has a keyboard 12 and a display 14. In addition to keyboard entry, data can be downloaded to the computer terminal 10 from a host computer or entered from a peripheral device such as a scanner.

The module providing for the entry of handwritten data is indicated generally by the reference numeral 16 and is shown in more detail in FIGS. 2 through 5. The module 16 consists of a suitable case 18 that houses a pad 20 for recording data in the manner described hereinafter. The case 18 has formed along the lower edge near the front a depending hinge 22 having a lug 24 extending along its entire length. Also, along the bottom surface 25 of the module 16 near the rear wall 26 is a cable plug 28 that will engage with a standard receptacle (not shown) on the top surface of the hand-held computer terminal 10. Plug 28 and the receptacle provide a standard 15-pin connection between these components. Near the rear of top surface 32 of module 16 there is provided a suitable 15-pin receptacle 34 that provides for connection of other external devices. The receptacle 34 and plug 28 are suitably interconnected by cable 36 inside of the case 18.

The hinge 22 with its locking lug 24 provide for easy, quick and removable connection of the module 16 to the computer terminal 10. By engaging the locking lug 24 under a corresponding shoulder 38 in the top surface of computer terminal 10 and rotating the module 16 rearwardly until the plug 28 on the module 16 engages the receptacle on the computer terminal 10, the module 16 is quickly and solidly affixed to the computer terminal 10 and all necessary connections made between plug 28 and receptacle. As will become more evident from the description hereinafter, the force applied by a user to the module 16 by entering handwritten data on the pad 20 will bias the module 16 further into a locked position on the computer terminal 10. In order to remove the module 16 from the computer terminal 10, the module 16 is grasped and rotated forwardly in the direction opposite to the force that is applied during use. Thus, connection between the module 16 and computer terminal 10 is a solid, positive connection that is quickly and easily made.

The pad 20 can be of any suitable type for recording handwritten data. If a suitable optical scanner (not shown) is to be used as a part of the system, the pad 20 can very simply be any suitable means in which handwritten data can be visibly recorded so that it can be scanned and entered into the system by the scanner. Suitable optical scanners are available for reading handwritten data of all types and processing the information read digitally and entering the digitalized data into the computer terminal 10. A suitable optical scanner for this purposes is described in the United States Patent Application Ser. No. 07/238,701, filed Aug. 31, 1988, by Steven E. Koenck, now U.S. Pat. No. 5,019,699, which application has been assigned to Norand Corporation, the same assignee of this application.

The pad 20 also may be a digitized pad of any suitable type containing resistive sheets 40 (FIG. 4) responsive to operating pressures in a suitable range normally applied by a user using a ballpoint pen. The digitized pad 20 using resistive sheets 40 preferably has sufficiently high resolution to provide an accurate representation of handwritten data including signatures. The resistive sheets 40 are preferably covered with an abrasion resistive cover 42 of a suitable polyester material. When the user enters data onto pad 20 by supplying sufficient pressure with a writing instrument to activate the resistive sheets 40, the information is digitized, compressed, stored and processed by the computer terminal 10. For example, if the module 16 is being used for signature verification, a signature written on pad 20 can be immediately verified or stored for future verification.

The module 16 of the invention provides the capability of capturing and recording handwritten data of all types, which data can be entered either directly using a digitizing pad on the module or the handwritten data can be entered into the data terminal by a suitable optical scanner for further processing. All types of handwritten data, including both texts and graphics, can be captured using the module of the invention in connection with a portable hand-held data terminal. One example that has been described is the verification of signatures. but any handwritten data can be entered directly or scanned into the terminal, the amount of data being limited by the available memory. The module of the invention thus provides a vehicle for significant data entry means not presently available with hand-held type computer terminals. Although the invention has been described in connection with certain preferred embodiments thereof, it would be evident to those skilled in the art that various revisions and modifications to the preferred embodiment, as well as additional applications to those described by way of example herein can be made without departing from the spirit and scope of the invention. It is our intention however that all such revisions and modifications that may be obvious to those skilled in the art will be included within the scope of the following claims.

What is claimed is as follows:

1. Apparatus for capturing handwritten data, comprising a hand-held self-contained portable handwritten data capture assembly capable of receiving normally generated handwritten material, said assembly comprising an integral combination of a portable data terminal for processing data, a removable handwritten data receiving module removably connected to the data terminal and having a longitudinally extensive receiving surface for receiving a specially extended sequence of information conveying handwritten data while the module is connected with the data terminal, and means in said module for reading the spacially extended sequence of information conveying handwritten data as applied to said receiving surface and entering the data into the data terminal.

2. The data capturing apparatus of claim 1 in which the means for reading the handwritten data is an optical digital scanner operatively connected with said portable data terminal and operative for optical reading of handwritten data on the receiving surface.

3. The data capturing apparatus of claim 1 in which the means for reading the handwritten data includes a digitizing pad operatively associated with said longitudinally extensive receiving surface.

4. The data capturing apparatus of claim 1 in which the data terminal is a hand-held unit.

5. The data capturing apparatus of claim 4 in which the module providing for entry of the handwritten data is quickly removable as a unit from the hand-held data terminal, the data terminal being fully operational for reading and processing data while separate from said module.

6. The data capturing apparatus of claim 1 wherein the module has a snap-on mechanical connection with the data terminal such that the module is readily attached to and detached from the data terminal.

7. The data capturing apparatus of claim 1 wherein the data capture assembly is constructed to receive and store cursive handwritten data such as signatures.

* * * * *